3,197,428
COMPOSITION COMPRISING CEMENT AND A CO-POLYMER CONTAINING CARBOXYLATE AND ALCOHOL GROUPS
Frederick H. Siegele, Westport, Conn., assignor to American Cyanamid Company, New York, N.Y., a corporation of Maine
No Drawing. Filed Oct. 13, 1961, Ser. No. 144,840
14 Claims. (Cl. 260—29.6)

The present invention relates to improved well cementing composition materials. More particularly, it relates to well cementing composition materials which can be slurried in water and utilized to prevent premature fluid loss and time of set of such cement composition materials.

In the completion of oil or gas wells, there is ever present a vexing problem in the cementing of casing, namely, fluid loss from the cement which causes premature cement setting. This fluid loss is due to the particular environmental soil conditions as well as the presence of elevated temperatures and elevated pressures. For instance, temperatures in deep wells may be in excess of 200° F. and pressures of more than 500 p.s.i. have been recorded. Further, in many formations, the earth about the casing is porous permitting water to be extracted from the cement introduced behind such pipes. These difficulties cause the cement to set prematurely and, therefore, ordinary cement compositions cannot be effectively used.

Many attempts have been made to overcome these difficulties. More recently, acrylamide-acrylic acid copolymer additives have been employed to reduce fluid loss in cement. However, these materials are not entirely satisfactory, for the principal reason that such additives cannot withstand elevated temperatures and pressures and, therefore, cannot be satisfactorily employed in deep well operations. Other cement additives, such as carboxymethyl hydroxyethyl cellulose, have been employed but these must be used in such high concentrations to be effective as a fluid loss agent with the consequence that they retard cement setting beyond commercial desirability.

A principal object of the present invention, therefore, is to provide an improved cement composition useful for cementing the walls of wells and well casing. Another object is to provide low water-loss well-cementing materials particularly useful at temperatures in excess of 200° F. and pressures of about 500 p.s.i. and which will neither accelerate or retard the setting of cement nor contaminate the earth formation in bore holes with cement fluids to any substantial degree. Other objects and advantages will become apparent to a skilled practitioner upon consideration of the following description.

To this end, a cement is provided which comprises in admixture therewith the below-defined hydrolyzed, water-soluble copolymer of a vinyl ester and a monomer which, on hydrolysis, can yield an $\alpha,\beta$-unsaturated carboxylic acid. It has further been found that aqueous slurries prepared from the polymer and cement mixture are particularly advantageously employed at elevated temperatures and pressures without substantial premature setting of the cement composition.

According to the instant invention, homogeneous hydrolyzed, water-soluble, vinylic copolymers containing critical ratios of hydroxyl to carboxylate groups are provided. In accordance with the present practice, a small amount of a substantially homogeneous, linear hydrocarbon-chain polymer of relatively high molecular weight containing predominantly hydrophilic hydroxyl groups and a lesser number of carboxylate groups is admixed with a cement either in the dry form or in a slurried aqueous state. It is a prime requirement, however, that the mole ratio of the hydroxyl groups to the carboxylate groups be maintained within predetermined limits.

Advantageously, there are utilized substantially homogeneous, hydrolyzed polymers derived from vinyl acetate and an $\alpha,\beta$-unsaturated carboxylic acid derivative. Illustrative derivatives include, for instance, methyl acrylate, ethyl acrylate, propyl acrylate, methyl methacrylate, diethyl fumarate, dimethyl maleate, and equivalents thereof. In the so-formed polymers, the molar ratio of resultant polyvinyl alcohol to either alkali metal salt of polyacrylate, polymethacrylate, polymaleate or polyfumarate formed during said polymerization and subsequent alkaline hydrolysis is established such that the molar ratio of hydroxyl groups to alkali metal carboxylate groups resides within the critical range of 82 to 97 and 18 to 3, respectively. However, for optimum performance, it has been found that a molar ratio of hydroxyl to carboxylate groups should be maintained within the range of between 87.5 to 95.5 (hydroxyl) and 12.5 to 4.5 (carboxylate) in the polymer to be added to a cement.

In general, the substantially homogeneous hydrolyzed polymers, hereinabove described, can be conveniently prepared by instantaneous copolymerization of vinyl acetate and a requisite amount of either a carboxylic acid monomer as, for instance, acrylic acid, methacrylic acid, fumaric acid, maleic acid or equivalent hereinabove-stated carboxylic acid derivatives, which on alkaline hydrolysis yield carboxylic acid salts. These salts are illustratively the corresponding sodium, potassium, lithium or magnesium salts. Other exemplary carboxylic acid derivatives contemplated herein are, for instance, acrylonitrile and acrylamide.

It is an advantage of the invention that any of the cements of commerce may be admixed with the polymers as above-defined. These cements are described, for instance, in United States Letters Patent No. 2,868,753. However, the invention will be described with particular reference to Portland and puzzolar cements. Advantageously, methods of admixing may be widely varied. For instance, the polymer can be added to dry cement. It can also be added, if desired, to water prior to slurrying the cement. Alternatively, the cement can be slurried in water and the polymer additive incorporated subsequently. In the event, the slurry procedure is practiced, usually from 25 to 75 parts of dry cement are slurried with from 75 to 25 parts of water, on a weight basis, for best results.

The quantity of copolymers added to the above cement may be varied over a wide range. It has been determined that from about 0.1 pound to about 3 pounds of polymer based on 100 pounds of dry cement is a good practice where such cement compositions are utilized at temperatures above 200° F., although larger quantities of polymers even as high as six pounds per one hundred pounds of cement may be employed without deleterious effect. For most purposes, however, quantities in the range of about 0.2 pound to 2 pounds of polymer based on 100 pounds of cement are entirely satisfactory.

The invention will be illustrated further by the following specific examples. It will be noted, however, that the examples, while describing the invention, are given primarily for purposes of illustration and are not deemed to be limitative of the invention.

EXAMPLE 1

In a suitable reaction vessel are added 61 parts of methyl acrylate and 828 parts of vinyl acetate. The mixture is emulsified in 1300 parts of water containing 2.5 parts of di(2-ethylhexyl) sodium sulfosuccinate, 1.5 parts of dihexyl sodium sulfosuccinate and 0.87 part of sodium sulfite. In a separate vessel, 1.0 part of ammonium persulfate is dissolved in 250 parts of water. The mixtures in each reaction vessel are fed to a suitable third vessel containing 5.0 parts of polyvinyl alcohol, 1.0 part of dihexyl sodium sulfosuccinate and 500 parts of water at a constant addition ratio over a period of about one hour. The contents in the latter reaction vessel are heated and held at 70° C. and, after a total of two hours, the polymerization is essentially complete.

The polymer emulsion is hydrolyzed by the addition of the emulsion to a reaction vessel containing 360 parts of sodium hydroxide dissolved in 1500 parts of water heated to 90° C. Resultant sodium acrylate-vinyl alcohol copolymer is completely hydrolyzed after eight hours and is found to contain approximately 7 mol percent of sodium polyacrylate and about 93 mol percent polyvinyl alcohol. It is precipitated in methanol and then dried. At a concentration of 0.5%, the water-soluble copolymer possesses a specific viscosity of 0.61 at 30° C. in a 0.5 N sodium chloride solution.

Acrylic acid, acrylonitrile, methyl methacrylate, diethyl fumarate and dimethyl maleate have each been substituted for methyl acrylate in the above procedure with the formation of resultant hydrolyzed homogeneous copolymers having good fluid-loss reducing properties when incorporated in cement materials.

EXAMPLE 2

The fluid loss in several cement-water slurries as prepared hereinbelow is determined by the procedure used for measuring the water loss of drilling muds as described in A.P.I. Bulletin R.P. 29 (May 1950). This procedure involves the use of a pressure filter containing a cylinder, three inches in diameter and whose height is at least two and one-half inches, fitted with a cap having a hole for the pressure medium and a bottom screen supporting a 325 mesh wire screen or a sheet of filter paper with a diameter of 9 centimeters. The filter area is seven square inches. A sample of the cement slurry under test, usually between about 200 cc. and 225 cc., is poured into the cylinder. A nitrogen pressure of 100 pounds per square inch is then applied and the volume of filtrate obtained during the 30 minute test is measured.

Hydraulic cement slurries are prepared by mixing 400 parts of screened Portland cement with 184 parts of water containing the hydrolyzed, substantially homogeneous vinyl alcohol-acrylic acid copolymer sodium salt as prepared in Example 1 above. The mixing of the so-obtained cement composition is accompanied by vigorous agitation for one minute and tested for fluid loss under 100 p.s.i. at room temperature. The density of the cement is 15.4 pounds per gallon.

Varying proportions of the aforementioned copolymer ranging from 0.1% to 2.0% on the dry weight of the cement are employed. As a control, a cement prepared as above but without any polymeric additive is tested for fluid loss. The quantity of filtrate obtained, expressed in cubic centimeters, is shown in Table I below.

Table I

| Run | Percent Copolymer Salt | 30 Minute Fluid Loss in cc. |
|---|---|---|
| 1 | Control | (1 minute) 90 |
| 2 | 0.1 | 28 |
| 3 | 0.2 | 15 |
| 4 | 0.4 | 6.3 |
| 5 | 0.8 | 2.8 |
| 6 | 1.5 | 1.4 |
| 7 | 2.0 | 1.1 |

EXAMPLE 3

Repeating Example 2 in every material respect except that sodium methacrylate is substituted for sodium acrylate, the fluid loss of a cement containing 1.0% of the copolymer, having a specific viscosity of 0.33, after thirty minutes is 3.0 cc.

Replacing Portland cement with puzzolan cement containing 1.0% of the copolymer, as in this example, fluid loss after thirty minutes is determined as 3.5 cc.

EXAMPLE 4

In order to determine the effect of copolymer ratio on performance, the fluid loss control of vinyl alcohol-sodium acrylate copolymer of varying hydroxyl and carboxylate contents is compared. The polymers are prepared under identical polymerization conditions varying only the comonomer ratio. This data is presented in Table II utilizing the test outlined in Example 2 above. The polymer concentration is maintained at 0.9%, based on the weight of the cement.

Table II

| Run | Mol Percent Sodium Carboxylate/Mol Percent Vinyl Alcohol | 30 Minute Fluid Loss in cc. |
|---|---|---|
| 1 | 3/97 | 11 |
| 2 | 4/96 | 6 |
| 3 | 7/93 | 2.6 |
| 4 | 10/90 | 3.2 |
| 5 | 15/85 | 16.5 |

EXAMPLE 5

This example demonstrates the critically significant requirement for a fluid loss control additive in cement, namely, that in addition to controlling the loss of fluid, it does not accelerate or retard the setting of the cement at elevated temperatures.

The procedure for determining cement setting times at elevated temperatures utilizes a penetromter which is described in Test D937–49T in A.S.T.M. Standards on Petroleum Products and Lubricants, 1952, pp. 385-6. In that procedure, the penetrometer is used to determine the consistency of petrolatum. For purposes of this test, the penetrometer is used to test the hardness of cement samples. The penetrometer probe plus a 50 gram weight impose a total load of 102 grams on each sample. Maximum penetration, i.e., a perfectly fluid cement, corresponds to a probe penetration of 38 millimeters. A set, i.e., solid cement, corresponds to 0 millimeter penetration.

A master mixture consisting of 400 parts of Portland cement, 184 parts of water, and one part of a standard fluid loss retarder, carboxymethyl hydroxyethyl cellulose, is prepared. To aliquot portions of the master mixture are then added the below-defined fluid-loss control agents at a level of 0.75 weight percent relative to dry cement used. These compositions including the master mixture per se, are concurrently aged at 220° F. for varying times and penetrometer readings are taken. The data is recorded in the following table.

Table III.—Effect of additives on cement set time

| Run | Additive | Penetrometer Reading (mm.) after Cement Heated at 220° F. for the Period Indicated (Hours) | | | |
|---|---|---|---|---|---|
| | | 0 | 1.5 | 2.5 | 3.5 |
| 1 | None (Master Mixture Control) | 38 | 38 | 38 | 0 |
| 2 | 90 mol percent Acrylamide and 10 mol percent Acrylic Acid Copolymer. | 38 | 18 | 0 | 0 |
| 3 | 7 mol percent Sodium Acrylate and 93 mol percent Vinyl Alcohol Copolymer of Example 1. | 38 | 38 | 38 | 0 |
| 4 | 7 mol percent Sodium Methacrylate and 93 mol percent Vinyl Alcohol Copolymer of Example 3. | 38 | 38 | 38 | 0 |

It will be noted that, after one and one-half hours, setting of the cement containing the acrylamide-acrylic acid copolymer has proceeded quite extensively. Surprisingly, the cement compositions of the present invention remain fluid for more than two and one-half hours. Further, the latter cement compositions remain unchanged with respect to the master mixture control in that the polymeric additives of the present invention do not either retard or accelerate the setting of these compositions.

I claim:

1. A cement composition capable of forming a fluid slurry when mixed with water, said cement composition comprising a dry hydraulic cement mixed with from 0.1 to 3 weight percent, based on said hydraulic cement, of a homogeneous, completely hydrolyzed, water-soluble copolymer prepared from vinyl acetate and an $\alpha,\beta$-unsaturated monocarboxylic acid derivative selected from the group consisting of acrylic acid, methacrylic acid, methyl acrylate, ethyl acrylate, propyl acrylate, methyl methacrylate, diethyl fumarate, dimethyl maleate, fumaric acid, maleic acid and acrylonitrile, said copolymer containing hydroxyl and alkali metal carboxylate groups, the groups being present in said copolymer in the mol ratio of from 97 to 82 of hydroxyl and from 3 to 18 of the alkali metal carboxylate, respectively.

2. A cement composition according to claim 1, in which the hydroxyl and carboxylate groups are established at a mol ratio of from 87.5 to 95.5 and from 12.5 to 4.5 respectively.

3. A cement composition according to claim 1, in which the alkali metal carboxylate is an alkali metal polyacrylate.

4. A cement composition according to claim 1, in which the hydroxyl group is present as polyvinyl alcohol and the alkali metal carboxylate is present as sodium polyacrylate.

5. A cement composition according to claim 1, which contains the hydroxyl group as polyvinyl alcohol and the alkali metal carboxylate as sodium polymethacrylate.

6. A cement composition according to claim 1, in which the hydraulic cement is Portland cement.

7. A cement composition according to claim 1, in which the hydraulic cement is puzzolan cement.

8. A hydraulic cement slurry comprising a hydraulic cement mixed with from 0.1 to 3 weight percent, based on said dry hydraulic cement, of a water-soluble, homogeneous, completely hydrolyzed copolymer prepared from vinyl acetate and an $\alpha,\beta$-unsaturated monocarboxylic acid derivative selected from the group consisting of acrylic acid, methacrylic acid, methyl acrylate, ethyl acrylate, propyl acrylate, methyl methacrylate, diethyl fumarate, dimethyl maleate, fumaric acid, maleic acid and acrylonitrile, said copolymer containing hydroxyl and alkali metal carboxylate groups, the groups being present in the mol ratio of from 97 to 82 of hydroxyl and from 3 to 18 of the alkali metal carboxylate, respectively, and sufficient water to form a readily pumpable slurry.

9. A hydraulic cement slurry according to claim 8, in which the hydroxyl and carboxylate groups are established at a mol ratio of from 87.5 to 95.5 and from 12.5 to 4.5, respectively.

10. A hydraulic cement slurry according to claim 8, in which the alkali metal carboxylate is sodium acrylate.

11. A hydraulic cement slurry according to claim 8, in which the hydroxyl group is present as polyvinyl alcohol and the alkali metal carboxylate group is present as sodium polyacrylate.

12. A hydraulic cement slurry according to claim 8, in which the hydroxyl group is present as polyvinyl alcohol and the alkali metal carboxylate group is present as sodium polymethacrylate.

13. A hydraulic cement slurry according to claim 8, in which the hydraulic cement is Portland cement.

14. A hydraulic cement slurry according to claim 8, in which the hydraulic cement is puzzolan cement.

References Cited in the file of this patent

UNITED STATES PATENTS

| | | | |
|---|---|---|---|
| 2,576,955 | 12/51 | Ludwig | 260—29.6 |
| 2,614,998 | 10/52 | Lea | 260—29.6 |
| 2,661,308 | 12/53 | Azorlosa | 260—29.6 |
| 2,868,753 | 1/59 | Morgan et al. | 260—29.6 |

MURRAY TILLMAN, *Primary Examiner.*

LEON J. BERCOVITZ, *Examiner.*